US010444002B2

(12) United States Patent
Tregret et al.

(10) Patent No.: US 10,444,002 B2
(45) Date of Patent: Oct. 15, 2019

(54) SENSOR DEVICE FOR GEOMETRICALLY TESTING PARTS

(71) Applicant: ACTIMESURE, Notre Dame D'oe (FR)

(72) Inventors: Samuel Tregret, Monnaie (FR); Philippe Prunet, Neuvy le Roi (FR); Vincent Jarry, La Membrolle sur Choisille (FR)

(73) Assignee: ACTIMESURE, Notre Dame D'oe (FR)

( * ) Notice: Subject to any disclaimer, the term of this patent is extended or adjusted under 35 U.S.C. 154(b) by 79 days.

(21) Appl. No.: 15/746,986

(22) PCT Filed: Jul. 23, 2015

(86) PCT No.: PCT/FR2015/052039
§ 371 (c)(1),
(2) Date: Jan. 23, 2018

(87) PCT Pub. No.: WO2017/013309
PCT Pub. Date: Jan. 26, 2017

(65) Prior Publication Data
US 2019/0011245 A1    Jan. 10, 2019

(51) Int. Cl.
*G01B 7/02* (2006.01)
*G01B 7/012* (2006.01)
(Continued)

(52) U.S. Cl.
CPC ............. *G01B 7/012* (2013.01); *G01B 3/008* (2013.01); *G01B 3/22* (2013.01); *G01B 7/002* (2013.01);
(Continued)

(58) Field of Classification Search
CPC .............................. G01B 7/003; G01D 5/3476
(Continued)

(56) References Cited

U.S. PATENT DOCUMENTS 4,777,361 A * 10/1988 Affa ................... G01D 5/34738
250/237 G
5,174,039 A    12/1992 Murai
(Continued)

FOREIGN PATENT DOCUMENTS

| EP | 0284737 A1 | 10/1988 |
| FR | 2997490 A1 | 5/2014 |
| GB | 2238616 A | 6/1991 |

OTHER PUBLICATIONS

English translation of the Written Opinion of the International Searching Authority dated Mar. 14, 2016 for corresponding International Application No. PCT/FR2015/052039, filed Jul. 23, 2015.
(Continued)

*Primary Examiner* — George B Bennett
(74) *Attorney, Agent, or Firm* — David D. Brush; Westman, Champlin & Koehler, P.A.

(57) ABSTRACT

A feeler device for geometrically controlling parts, capable of determining the position of a feeler member when it comes into contact with a part to be controlled. The feeler device includes a motorized contact rod movable in translation inside a housing and a microcontroller for controlling the movement of the rod. The contact rod is driven in translation by friction with an element linked to the rotary shaft of a motor, and the contact rod cooperates with a magnetic sensor in order to detect the position of same.

14 Claims, 4 Drawing Sheets

(51) Int. Cl.
*G01B 7/00* (2006.01)
*G01B 3/22* (2006.01)
*G01B 3/00* (2006.01)
*G01B 11/00* (2006.01)
*G01B 21/04* (2006.01)

(52) U.S. Cl.
CPC .......... *G01B 11/007* (2013.01); *G01B 21/047* (2013.01)

(58) Field of Classification Search
USPC .................................. 33/706, 707, 708, 832
See application file for complete search history.

(56) References Cited

U.S. PATENT DOCUMENTS

| | | | | |
|---|---|---|---|---|
| 5,394,082 | A * | 2/1995 | Schiessle | F01L 1/46 324/207.15 |
| 5,955,881 | A | 9/1999 | White et al. | |
| 5,979,069 | A * | 11/1999 | Hayashida | G01B 3/22 33/556 |
| 6,018,881 | A * | 2/2000 | Spies | G01D 5/145 324/207.24 |
| 7,530,177 | B1 * | 5/2009 | Meichle | G01B 3/205 33/708 |
| 2002/0125884 | A1 * | 9/2002 | Wendt | G01B 7/003 324/207.24 |
| 2003/0183788 | A1 * | 10/2003 | Pastyr | G01B 7/003 250/505.1 |
| 2003/0197504 | A1 | 10/2003 | Gray et al. | |
| 2004/0103551 | A1 * | 6/2004 | Wahl | F16C 29/005 33/707 |
| 2007/0256313 | A1 * | 11/2007 | McAdam | G01D 5/2451 33/706 |
| 2010/0050455 | A1 * | 3/2010 | Siraky | G01D 5/2457 33/708 |
| 2014/0266162 | A1 * | 9/2014 | Nyce | G01B 7/14 324/207.13 |
| 2015/0035519 | A1 * | 2/2015 | Buelau | G01D 5/2291 324/207.18 |
| 2016/0011017 | A1 * | 1/2016 | Hayashi | G01D 5/34753 33/707 |
| 2018/0245906 | A1 * | 8/2018 | Hoenicka | G01D 5/202 |
| 2019/0025087 | A1 * | 1/2019 | Acker | G01D 5/2046 |

OTHER PUBLICATIONS

International Search Report dated Mar. 14, 2016 for corresponding International Application No. PCT/FR2015/052039, filed Jul. 23, 2015.

Written Opinion of the International Searching Authority dated Mar. 14, 2016 for corresponding International Application No. PCT/FR2015/052039, filed Jul. 23, 2015.

* cited by examiner

SENSOR DEVICE FOR GEOMETRICALLY TESTING PARTS

CROSS-REFERENCE TO RELATED APPLICATIONS

This Application is a Section 371 National Stage Application of International Application No. PCT/FR2015/052039, filed Jul. 23, 2015, which is incorporated by reference in its entirety and published as WO 2017/013309 A1 on Jan. 26, 2017, not in English.

TECHNICAL FIELD OF THE INVENTION

The invention relates to the field of detecting the position of a sensor body when it enters into contact with a part to be tested.

PRIOR ART

In industry, it is usual to test the quality of parts and, in particular, test their geometry, either alongside the production chain (in other words, during production), or at the end of production. It is therefore necessary to provide a specific test station, wherein the part to be tested is brought to be tested there by an operator. For a long time, a gauge has been used for this purpose; this test operation requires a prior calibration for a given standard value and the operator checks if the standard value is adhered to at the level of the part to be tested. Even if all parts of a series are not thus tested manually, such a test takes time, which is not compatible with sustained production paces. Accelerating paces in production chains makes such a test problematic, even inoperative.

In addition, such an operation is costly in time, in material; furthermore, problems with reliability can occur. That is why a quicker processing of parts to be tested has been searched for, which, moreover, is reliable and cheap.

The patent application FR 2 997 490 partially responds to this problem, by proposing a semi-automatic geometric test device, with magnetic encoding. In this device, the sensor body is supported by a rod assembled moving forward inside a support case, opposite the fixed magnetic sensor means supported by the case, and sensitive to magnetic encoding magnetised markers that the rod supports for detecting the position of this rod. Contrary to the prior art, this device constitutes an improvement, in that it enables a reliable, solid measurement to be taken, with cheap equipment. In this system, the case integrates all the necessary components, on the one hand, for detecting a contact of sensor means, and on the other hand, for utilising this detection for measuring the movement of the sensor means, such that this device is autonomous and enables automatic measurements to be taken at a quite sustained pace.

However, improvements have proved to be necessary, in particular at the level of reliability regarding adjustment, movement speed of the sensor rod, or contact of the rod with the part to be tested; the precision of the measurement is another parameter which requires an improvement, as demanded by manufacturers.

DESCRIPTION OF THE INVENTION

The invention aims to remedy the disadvantages of the state of the art, in particular, concerning the reliability of the measurement, the speed thereof, as well as the protection of the sensor rod. By rod or contact read, this means the extended element, of which the end enters into contact with the part to be measured.

The invention relates to a sensor device for the geometric testing of parts, able to determine the position of a sensor body when it enters into contact with a part to be tested, comprising a motorised contact rod, moving forward inside a case, a microcontroller controlling the movement of the rod.

According to a first aspect of the invention, the rod cooperates with a magnetic sensor for detecting the position thereof.

According to a first embodiment of the invention, said contact rod is driven forward by direct or indirection friction with the rotating axis of an engine.

These characteristics improve the reliability of the measurement, the speed thereof, as well as the protection of the sensor rod.

Usefully, the device according to the invention comprises a counter-brace or restraining part for the friction-contact counter-brace of the sensor rod with the rotating axis of the engine, said part being fixed on said case.

According to an embodiment of the invention, the counter-brace or restraining part comprises a roller.

According to another embodiment of the invention, the counter-brace or restraining part comprises a gasket for guiding said rod, which extends partially inside the case and has a notch there able to constitute two support edges.

According to another aspect of the invention, the sensor device comprises at least one electronic board and software for managing the position of said rod, cooperating with the microcontroller.

More specifically, the sensor device comprises a first and a second electronic board, the first enables the acquisition of the measurement of the position of the rod, the second board enables the processing of the measurement of the position, as well as the acquisition and the processing of the force exerted on the contact rod. Here, it is useful to mechanically disengage the functions managed by the first and by the second boards, as the reliability of the adjustment in improved, in particular, the adjustment of point 0.

According to another characteristic, the device comprises a means for adjusting the pressure exerted by the contact rod on the part to be tested, configurable by the controlling means of said engine. Thus, managing the force exerted by the rod is improved.

Usefully, the device according to the invention comprises a magnetic strip positioned on said rod, to detect the position thereof by cooperating with the magnetic acquisition means. The action of positioning a magnetic strip directly on the rod constitutes a simplification of the system which increases both the reliability and the precision of the measurement.

According to a useful variant of the invention, the engine used is of a linear type. Advantageously, the engine can be arranged in the extension of the rod and can comprise a pile (or alignment) of mobile magnets of alternatively inversed polarities with the rod, and a stator controlled by one of said electronic boards. This variant enables the volume of the device to be reduced, and also to increase the lifespan thereof, comparatively to using a rotary engine, for example.

Specifically and preferably, in a variant comprising a linear engine, said stator is fixed in said case and comprises a solenoid, of which the propulsions act on the pile of magnets to ensure the movement of said rod.

Conforming with another variant of the invention, said pile of magnets cooperates with a position detector and said stator in order to ensure both the movement of the rod and the detection of the position of the rod.

In addition, the device according to the invention can comprise sealing and protective means cooperating with at least one part of said case and/or said rod.

Moreover, the device according to the invention can comprise a display unit for reading at least one functioning parameter and/or for controlling said functioning. The display unit advantageously enables a reading of the information and an in situ and immediate configuration, hence an improved reactivity.

BRIEF DESCRIPTION OF THE FIGURES

Other characteristics and advantages of the invention will emerge upon reading the description which follows, in reference to the appended figures, which illustrate.

To be clearer, identical or similar elements are referenced by identical reference signs in all the figures.

DETAILED DESCRIPTION OF AN EMBODIMENT

Figure 1:
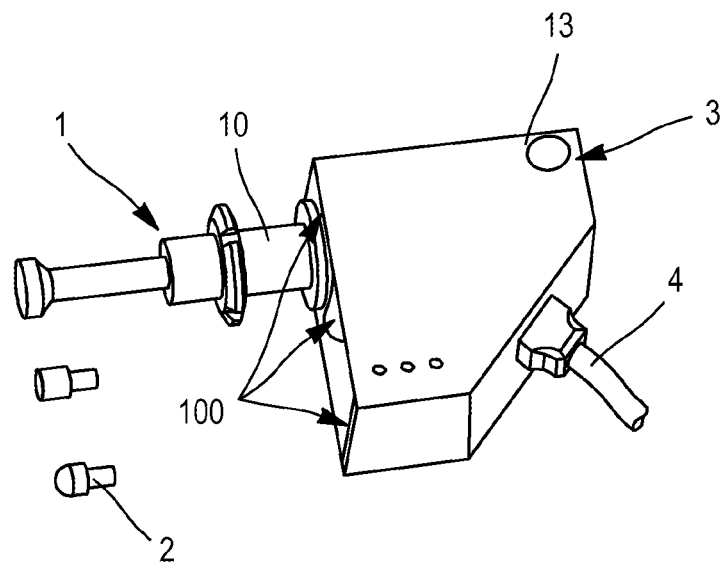
FIG. 1 shows a sensor device according to a first embodiment of the invention.

FIG. 1 illustrates a sensor device according to the invention, seen from the outside, in the entirety thereof. This device comprises, in particular, a rod 1 known as a contact rod, of which the free distal end is equipped with a head 2 able to enter into contact with the part to be measured, more specifically, with the chosen surface of the part to be measured. The rod 1 moves forward along the longitudinal axis thereof, and it is partially housed inside the case 3 which protects all the functional elements of the sensor device. Several head shapes can be considered without coming away from the scope of the invention; the shape is chosen by a skilled person. A guiding sleeve or gasket 10 can be provided, in order to guide and protect the distal end of the rod 1 in the retracted position. The guiding sleeve 10 is fixed and positioned on the suitable face of the case 3. In addition, an electric connecting cable 4 is provided, going beyond the outside of the case 3 which has a suitable opening for the passage and the fixing of a connection port by means of computer-type processing (not represented).

Figure 2:
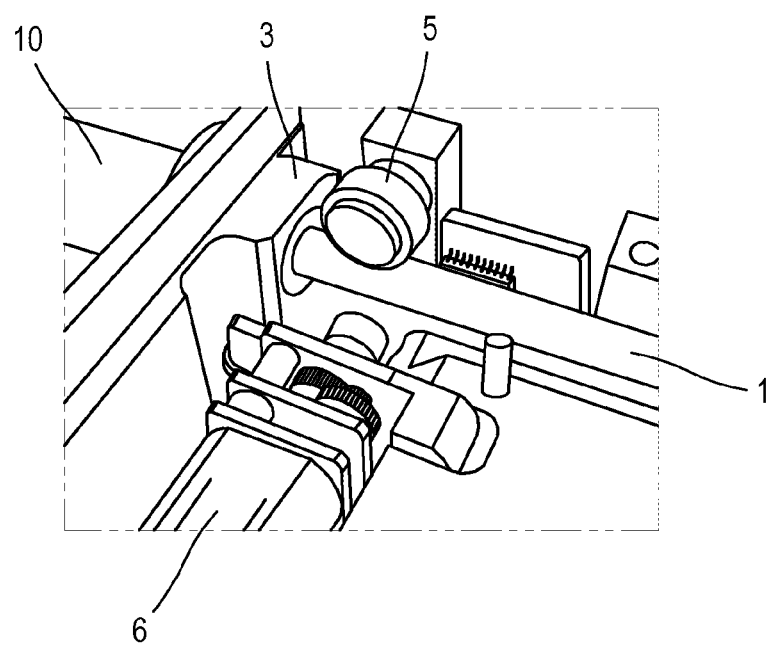
FIG. 2 illustrates in more detail, the drive of the rod of the sensor device.

FIG. 2 shows a part of the inside of the case and more specifically, the connection and the drive of the rod 1 according to a first embodiment of the invention: the rod is indeed driven forward by direct or indirect friction with the rotating axis of an engine 6, perpendicular to the axis of the rod 1. A supporting or restraining part such as a roller 5 connected to the case 3 enables to create a counterforce to the force of positioning the axis of the engine on the rod 1 of the sensor. The outlet axis or shaft of the engine 6 can cooperate with a gear, rack and pinion transmission system. Any mechanically equivalent transmission system enters into the scope of the invention. This drive-by-friction system of the rod 1 is useful, as in case of significant force exerted on the end of the rod 1, or in case of impact, the rod 1 moving forward can be stopped without damaging the rod. Thus, there is a sliding of the rod 1 opposite the axis of the engine 6, which prevents any breaking of or damage to the rod 1.

Figure 3:
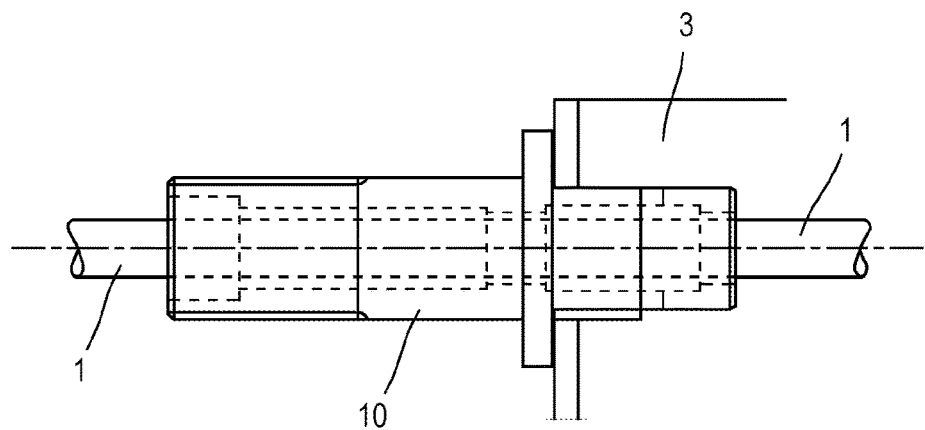
FIG. 3 illustrates a restraining gasket fixed on the case.
Figure 4:
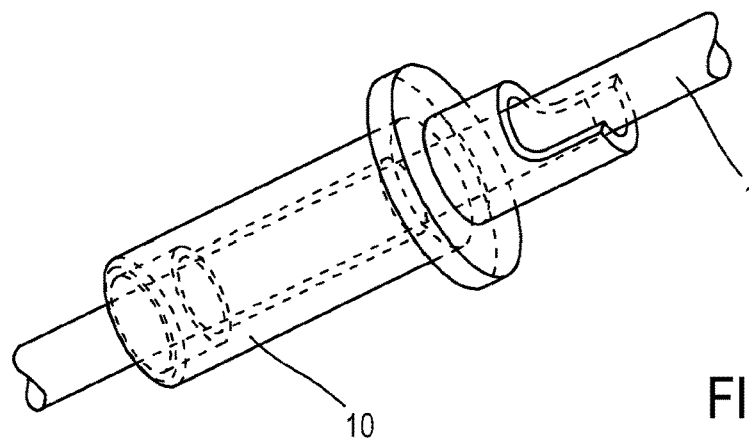
FIG. 4 shows the restraining gasket in perspective.

FIG. 3 and FIG. 4 show another form of an embodiment of the supporting or restraining part, which here comprises the modified guiding gasket 10, as opposed to the one in FIG. 2. The modified guiding gasket replaces the roller 5 illustrated in FIG. 2. The guiding gasket 10 extends here partially to the inside of the case 3, where there it has a notch such as visible in FIG. 3. The notch is therefore made to the end of the gasket 10 located inside the case 3; this end is presented as a semi-cylinder which curls around the upper surface of the rod 1 at this level. This arrangement enables to limit the contact surface and therefore, to guarantee minimal friction during the sliding of the rod 1, while preserving the restraining function thereof during the movement of the rod 1.

Figure 5:
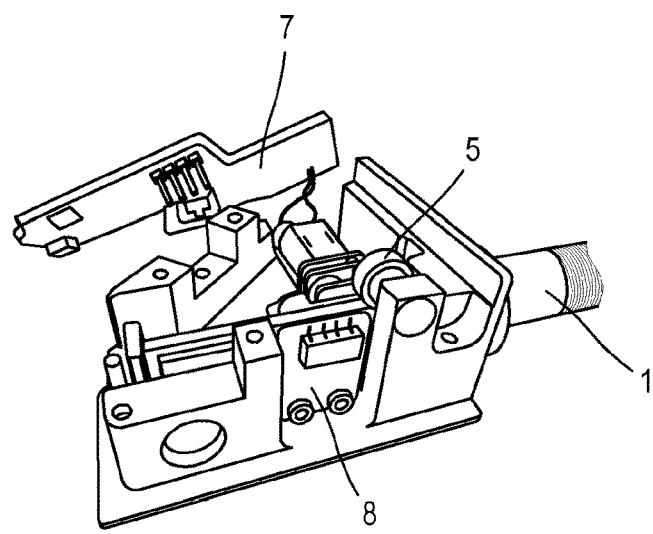
FIG. 5 shows the main elements constituting the invention.

FIG. 5 shows in other view, the inside of the case 3; more specifically, FIG. 5 shows the presence of several electronic boards 7, 8; these boards 7, 8 are, of course, positioned and protected by the cover or the case 3. Preferably, one of the boards known as a first board 7 enables to manage most of the functionalities of the device, in particular, the functioning of the engine 6, as well as the functioning of the connected optical components; thus, the first board advantageously enables to detect extreme positions (limit) of the rod 1. The second electronic board 8 is here dedicated to the acquisition of the measurement of the position of the rod; it is connected to the rod 1 and comprises the necessary components for the main function thereof; the adjustment of the point 0 is, in particular, managed by the second electronic board 8.

Figure 6:
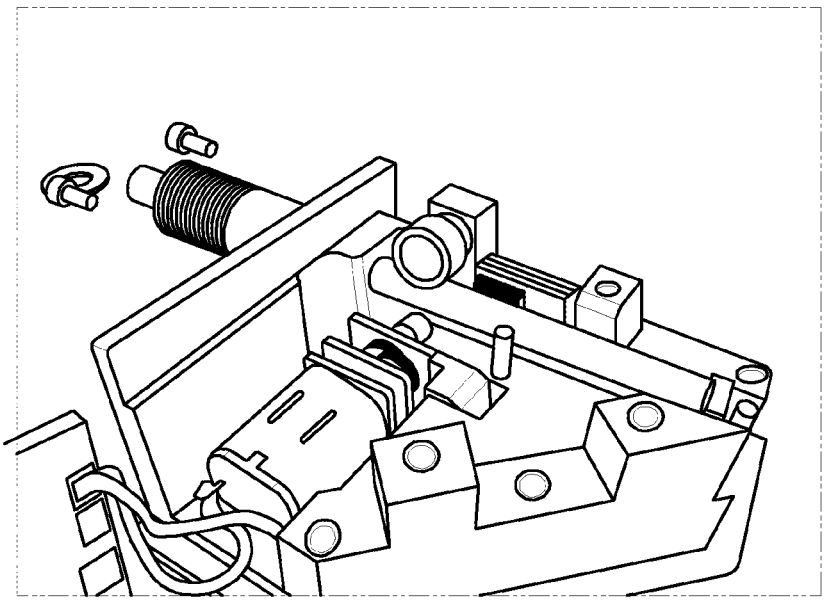
FIG. 6 illustrates the engine of an embodiment of the device according to the invention.

FIG. 6 illustrates the arrangement of the components inside the case 3, which here has an adapted shape, substantially according to a right-angled triangle, on a height H. The rod 1 extends parallel to one of the right sides of the triangle, whereas the engine 6 extends substantially along the other right side of the triangle. The second electronic board 8 extends along the height or thickness of the case 3, whereas the first electronic board, in a substantially triangular shape, is positioned along a main plane of the case 3. Of course, the shape of the case 3 is adapted to the embodiment considered, such that the shape shown in FIGS. 1 to 4 is illustrative and non-exhaustive.

Figure 7:
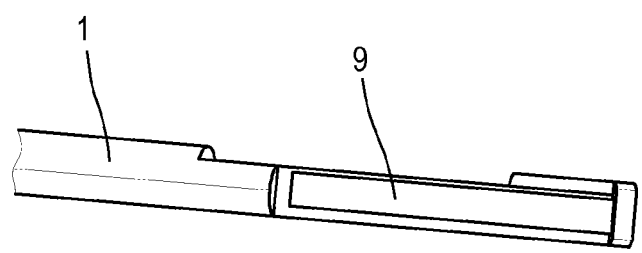
FIG. 7 shows the sensor rod supporting a magnetic strip.

FIG. 7 shows a part of the rod 1 which supports a magnetic strip 9 positioned on an especially adapted flat spot. The fact that the magnetic strip 9 is here directly fixed on the rod 1, increased the reliability and the precision of the measurement; no intermediate part disturbs the acquisition of the measurement of the position of the rod 1. According to this embodiment of the invention, the magnetic strip 9 comprises magnetised encoding markers arranged along the strip regularly, for example, every 2 mm. Correspondingly, the sensor means can be arranged on the second electronic board, for the reading of the position of the rod 1.

Means for detecting the position of the rod 1 are provided on the second electronic board 8. The rod thus moves between an initial or retracted position, according to which only the head 2 goes beyond the outside of the case 3, and a maximum outlet position, wherein the head 2 is located farther away from the case 3. The part to be tested is located between these two positions.

The principle of detecting the position of the rod 1 is based on a detection by reading the magnetic field. Inversions of polarities appear more or less regularly on the magnetic strip, and are matched with actual values measured during a calibration process. A matching table is thus constructed, it is specific to each device. When the rod 1 of the sensor device touches the part to be measured, the magnetic value read is linked to the corresponding value recorded in the memory of the microcontroller.

Information about the position of the rod is preferably transmitted in real time to software means able to calculate the movement thereof and therefore the movement of the sensor body thereof, between an initial position and the contact position with the part to be tested.

Figure 8:
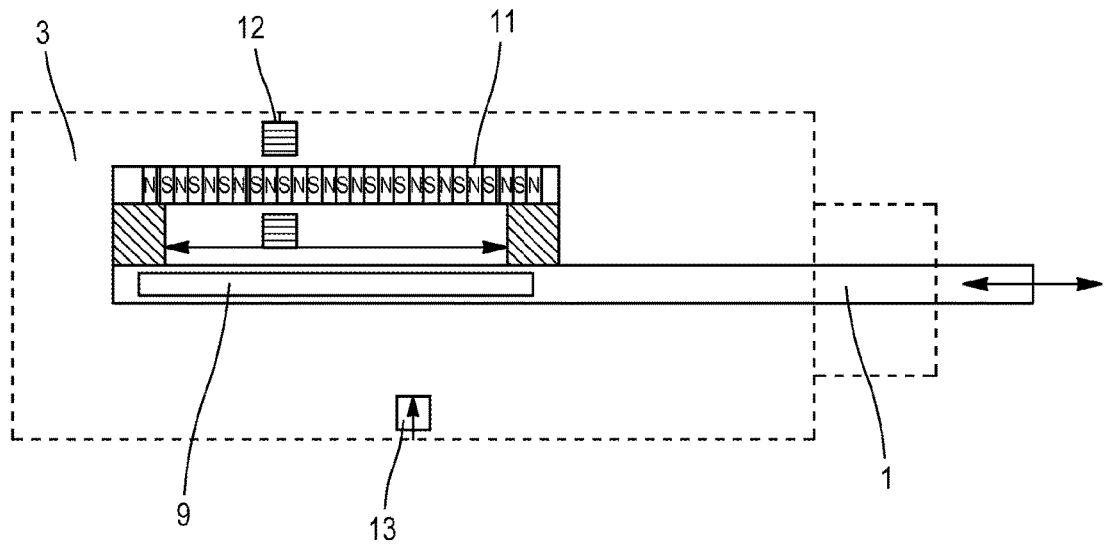
FIG. 8 is a diagram partially showing a second embodiment of the invention.

According to a second embodiment of the invention, such as schematised in FIG. 8, a linear engine is provided, arranged in the extension of the rod 1. A magnetic strip 11 constituted from a pile of magnets of permanent alternatively inversed polarities, is connected to the rod 1, for example, through a cogging material. A fixed position detector 13, for example, forming part of the second electronic board 8, enables to read the position of the mobile rod 1. A stator 12 comprised of a solenoid, propels a magnetic field changing direction according to the current which is applied to it. The solenoid therefore alternatively exerts an attraction and a repulsion on the pile of magnets (magnetic strip 11) which is thus found subjected to a force which constrains it moving linearly along the mechanical guiding elements implemented. A linear engine known per se, but chosen as suitable for the considered application, is therefore provided. The linear engine enables to reduce the volume of the device; in addition, this choice increases the lifespan thereof, in particular, as friction is reduced. As an illustration, an actuator of the brand Faulhaber, reference LM0830 01 FMM can be used.

Figure 9:
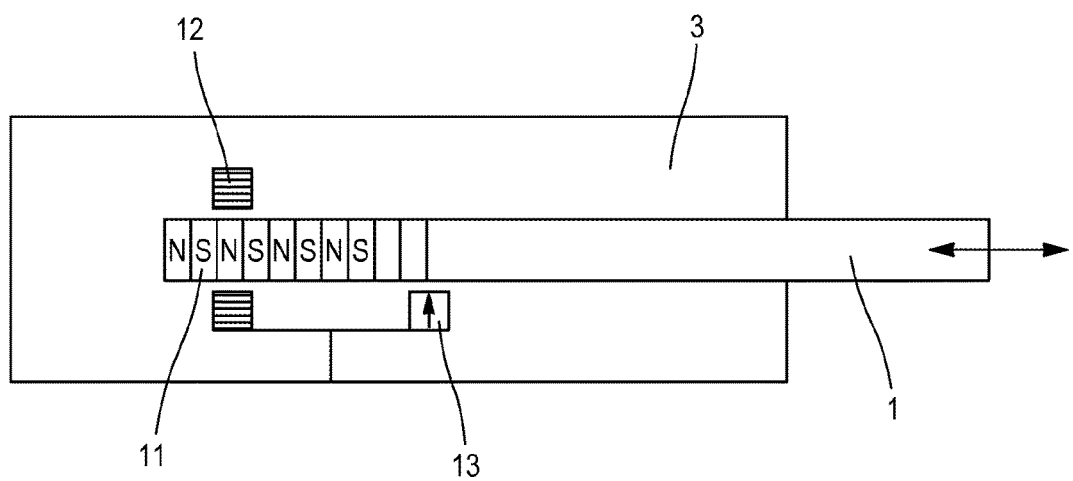
FIG. 9 is a diagram partially showing a third embodiment of the invention.

According to a third embodiment of the invention, and in order to simplify and understand the design of the sensor, FIG. 9 shows an alternative of the second embodiment, where the rod 1 comprises a pile of magnets 11 which fulfil a dual function. The first function consists of ensuring the mobility of the rod 1 via the same system as for FIG. 6. In other words, a set of magnetised solenoid 12, so as to create a magnetic field which ensures the linear movement of the rod 1. The second function dedicated to the pile of magnets 11 consists of reading the position of the rod 1 via the same device as for the conventional version of the sensor. This second function therefore enables the acquisition of the measurement of the position of the rod 1. The third embodiment can therefore be considered as a simplification of the second embodiment, in particular, because it implements a reduced number of components.

Of course, in any case, a reader 13 of the position of the rod 1 is provided, preferably fixed on the second electronic board 8.

Usefully, the device according to the invention can be equipped with means able to ensure the sealing thereof and/or the protection thereof in a hostile environment. Thus, a protective varnish can cover sensitive areas of the device, such as conductive parts, not covered and protected by the electronic board(s). Moreover, the areas 100 referenced in FIG. 1 can be treated specifically: a lubricant can be provided at the seal between the rod 1 and the nose inlet; a flexible elastomer or silicon seal can cover a part of the rod 1; a flexible seal can be assembled set in a grooving of the case. At the level of the seal between the USB cable 4 and the socket inside the case 3, a specific part equipped with elastomer lips can be provided. This part moulds the shape of the USB cable and prevents dust and liquids from entering inside the case 3. More generally, the seal can be made by covering the whole device with an ultra hydrophobic substance, such as commercialised under the brand 'ultra hydrophobe'. This product is a super hydrophobic and oleophobic coating which will repel most liquids. This product uses the technique of nanotechnology to create a coating and an air barrier on the surface of an object. This barrier repels water, oil, wet concrete and other liquids.

Moreover, the device according to the invention can comprise a display unit able to display information such as: value of the last measurement; name of the sensor; name of a gauge; identification of the sensor; number of cycles carried out. In addition, an actuator 13 advantageously enables: to navigate in a menu in order to display certain information; to trigger a measurement; to declare a measurement as the original point or zero. Of course, many other displays and controls are possible.

A useful aspect of the invention consists of adapting a magnetised gasket on the sleeve 10 in order to quickly fix the sensor device on the part to be measured.

Other ergonomic, technical or additional characteristics can be defined by a skilled person without coming away from the scope of the invention.

The invention claimed is:

1. A sensor device for geometric testing of parts, able to determine a position of a sensor body when the sensor body enters into contact with a part to be tested, the sensor device comprising:
   a case;
   an engine;
   a contact rod, motorised between an extended position and a retracted position relative to an inside of the case;
   a microcontroller for controlling the movement of the rod;
   a magnetic sensor, which cooperates with the contact rod to detect a position thereof; and
   a counter-brace or restraining part, which forms a friction-contact counter-brace of the contact rod with a rotating axis of the engine, said a counter-brace or restraining part being fixed on said case.

2. The sensor device according to claim 1, wherein said contact rod is driven forward by direct or indirect friction with the rotating axis of the engine.

3. The sensor device according to claim 1, wherein the counter-brace or restraining part comprises a roller.

4. The sensor device according to claim 1, wherein the restraining part comprises a guiding gasket of said rod which extends partially inside the case and has a notch there able to constitute two support edges.

5. The sensor device according to claim 1, which further comprises at least one electronic board and software for managing the position of said rod, cooperating with the microcontroller.

6. The sensor device according to claim 5, wherein the at least one electronic board comprises a first and a second electronic board, wherein the first electronic board enables acquisition of a measurement of the position of the contact rod, the second electronic board enables processing of the measurement of the position, as well as acquisition and processing of a force exerted on the contact rod.

7. The sensor device according to claim 1, further comprising means for adjusting the pressure exerted by the contact rod on the part to be tested, configurable by the microcontroller.

8. The sensor device according to claim 1, further comprising a magnetic strip positioned on said contact rod, to detect the position thereof by cooperating with the magnetic sensor.

9. The sensor device according to claim 1, wherein the engine is a linear engine.

10. The sensor device according to claim 9, wherein said engine is arranged in an extension of said contact rod, and comprises a pile of mobile magnets of alternatively inversed polarities with the rod, and a stator controlled by an electronic board.

11. The sensor device according to claim 10, wherein said stator is fixed in said case and comprises a solenoid, of which propulsions act on the pile of magnets to effect the movement of said rod.

12. The sensor device according to claim 10, wherein said pile of magnets cooperates with a position detector and said stator in order to ensure both the movement of the rod and the detection of the position of the rod.

13. The sensor device according to claim 1, further comprising sealing and protective means cooperating with at least one part of said case and/or said rod.

14. The sensor device according to claim 1, further comprising a display unit for reading at least one functioning parameter and/or for controlling a functioning of the sensor device.

* * * * *